US011379606B2

(12) United States Patent
Wang

(10) Patent No.: US 11,379,606 B2
(45) Date of Patent: Jul. 5, 2022

(54) PROVISION OF RISK INFORMATION ASSOCIATED WITH COMPROMISED ACCOUNTS

(71) Applicant: AppBugs, INC., Redmond, WA (US)

(72) Inventor: Rui Wang, Redmond, WA (US)

(73) Assignee: AppBugs, INC., Redmond, WA (US)

( * ) Notice: Subject to any disclaimer, the term of this patent is extended or adjusted under 35 U.S.C. 154(b) by 1143 days.

(21) Appl. No.: 15/906,521

(22) Filed: Feb. 27, 2018

(65) Prior Publication Data

US 2018/0189520 A1 Jul. 5, 2018

Related U.S. Application Data

(63) Continuation of application No. 15/833,133, filed on Dec. 6, 2017, now abandoned.

(60) Provisional application No. 62/543,857, filed on Aug. 10, 2017, provisional application No. 62/513,297, filed on May 31, 2017, provisional application No. 62/437,217, filed on Dec. 21, 2016.

(51) Int. Cl.
*G06F 21/62* (2013.01)
*G06Q 50/26* (2012.01)
*G06F 21/57* (2013.01)
*H04L 9/32* (2006.01)
*H04L 9/40* (2022.01)

(52) U.S. Cl.
CPC ........ *G06F 21/6245* (2013.01); *G06F 21/577* (2013.01); *G06F 21/6254* (2013.01); *G06Q 50/265* (2013.01); *H04L 9/3226* (2013.01); *H04L 9/3234* (2013.01); *H04L 9/3236* (2013.01); *H04L 63/083* (2013.01); *G06Q 2220/10* (2013.01); *H04L 63/1433* (2013.01)

(58) Field of Classification Search
None
See application file for complete search history.

(56) References Cited

U.S. PATENT DOCUMENTS

2017/0346797 A1* 11/2017 Yedidi ..................... H04L 63/14

* cited by examiner

*Primary Examiner* — John W Hayes
*Assistant Examiner* — Ari Shahabi
(74) *Attorney, Agent, or Firm* — Eversheds Sutherland (US) LLP

(57) ABSTRACT

Processes and systems described herein enable a computing device to detect compromised accounts. The computing device may obtain a user credential including a user ID, and further modify the user ID. The computing device may transmit the modified user ID to a service including a database related to compromised accounts, receive a record corresponding to the modified user ID that includes information of a compromised account, and further determine whether an account of the user ID is compromised based on the received record. Some implementations relate to the on-site provision of risk information associated with compromised accounts.

7 Claims, 10 Drawing Sheets

| ID | email address | password hash | salt | hash algorithm |
|----|---------------|---------------|------|----------------|
| 1 | moc.361@aaa | xxxxxxxxxxx | 3es4de7e | bcrypt |
| 2 | moc.liamg@zyx | xxxxxxxxxxx | Xdu64edw | bcrypt,md5 |
| 3 | moc.liamtoh@gfdre | xxxxxxxxxxx | Xejso86tged | bcrypt,sha1 |
| 4 | moc.liamg@7bob | xxxxxxxxxxx | wlefr5re | bcrypt |
| ... | | | | ... |

Table 302

ACCOUNT DATA 104

FIG. 3

| Index 702 | Encrypted Username 704 | Encrypted Password 706 |
|---|---|---|
| 1 | 8OB9i77Ihg1gpeF/S6Ys2w== | GqN0/Vc1PjAuu8FCBlRtIg==:097e5d3a40e4dee5e9a6dd5d5a0159d5 |
| 2 | PZc5nZQj84LYda4Iz7j+WA== | IZuOdDEMfyqx6AHANnMjCg==:73a60dfbc0a055fa607cdbff6b341721 |
| 3 | PZc5nZQj84LYda4Iz7j+WA== | GJf5DIZLmiYK/Yo6gx79Sw==:4930ed0453b6cd9c94107f72c977c5cf |
| 4 | 3J/jdeO5vWF4Bg+JH8cbpw== | VYy2XvqaqTfJVYzKfifDTQ==:0beb55245a3674deeaced1dcc47ca315 |
| ... | ... | ... |

FIG. 7

PROVISION OF RISK INFORMATION ASSOCIATED WITH COMPROMISED ACCOUNTS

CROSS REFERENCE TO RELATED PATENT APPLICATIONS

This application is Continuation Application of U.S. patent application Ser. No. 15/833,133, filed on Dec. 6, 2017, which claims priority to U.S. Provisional Patent Application No. 62/437,217, filed on Dec. 21, 2016, U.S. Provisional Patent Application No. 62/513,297, filed on May 31, 2017, and U.S. Provisional Patent Application No. 62/543,857, filed on Aug. 10, 2017, entitled "Provision of risk information associated with compromised accounts," which is hereby incorporated by reference in its entirety.

BACKGROUND

Last year over a billion accounts were exposed over the internet, and every year hundreds of millions of accounts are compromised in various acts of cyber-crimes. A report by Gemalto claims that more than a billion accounts were compromised during the year 2014. The report also highlights a shift in tactics by cybercriminals, traditionally cybercriminals targeted credit card information; but more recently, the aim is found to be identity theft. Stolen identities can then be used for various malicious activities like registration of fake credit cards, sold to marketers or creation of fake accounts.

For example, people usually tend to use the same identifier and password for various portals. Therefore, if the account information has been compromised once at one particular portal, there are chances that the stolen or compromised information can be used multiple times on various other portals. Hence, the confidentiality, concealment, and privacy of email identifiers along with passwords are important. If any of these is leaked or compromised, the account is considered a compromised account.

SUMMARY

Described herein are techniques and systems for the provision of risk information associated with compromised accounts. Various embodiments of this disclosure include obtaining, by a computing device, a user credential including a user ID, and modifying the user ID. The computing device may transmit the modified user ID to a service including a database related to compromised accounts, receive a record corresponding to the modified user ID that includes information of a compromised account, and further determine whether an account of the user ID is compromised based on the received record.

Some implementations relate to techniques and systems for the on-site provision of risk information associated with compromised accounts. In some implementations, the on-site provision of risk information associated with compromised accounts may be implemented by encrypted leaked credentials database and a hardware security module associated with an appliance that receives requests and returns search results to clients.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a diagram of an illustrative scheme that includes various records processed by a computing architecture illustrated in FIG. 1.

FIG. 7 is a diagram of an illustrative scheme that includes various records processed by a computing architecture illustrated in FIG. 6.

DETAILED DESCRIPTION

Implementations herein relate to techniques that enable websites and corporate IT systems to detect relevant compromised accounts. The implementations include collecting and storing a large amount of compromised account data by a service, which communicates with a website or an IT system. The implementations further include a communication protocol between the service and the website or IT system, and the communication protocol ensures security and privacy of user credentials without sacrificing the usability of compromised account detection.

For example, the implementations may help websites or enterprise IT systems to detect compromised accounts (e.g., the accounts whose credentials have already been exposed on the Internet). The websites or enterprise IT systems may provide anonymized user ID to the service and then determine whether an account associated with the user ID is compromised. During the process, concerns such as security, visibility, and risks of exposure of sensitive data are addressed.

Some implementations relate to techniques and systems for the on-site provision of risk information associated with compromised accounts. In some implementations, the on-site provision of risk information associated with compromised accounts may be implemented by encrypted leaked credentials database and a hardware security module associated with an appliance that receives requests and returns search results to clients.

Figure 1:
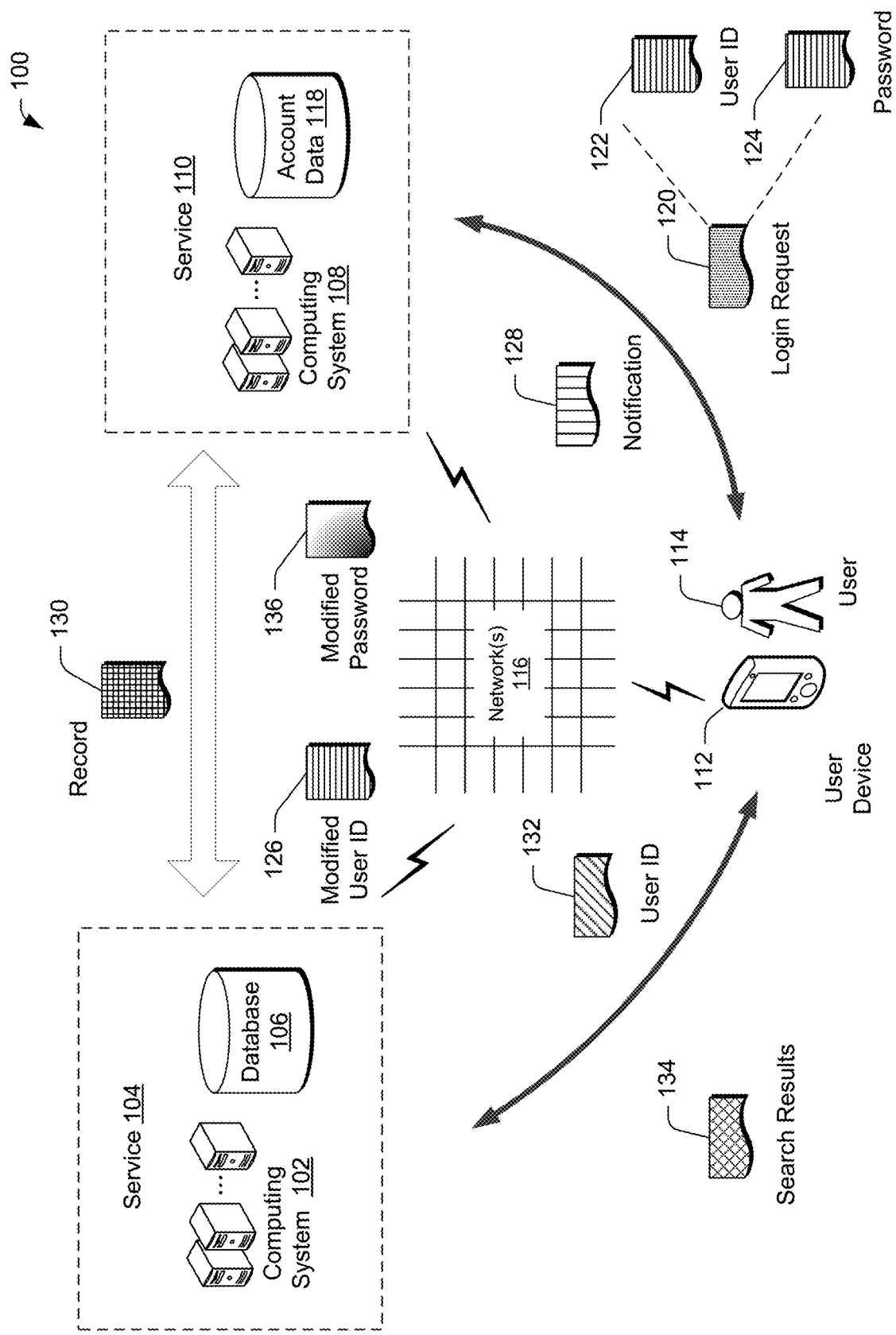
FIG. 1 is a diagram of an illustrative computing environment that includes a computing architecture for provision of risk information associated with compromised accounts.

FIG. 1 is a diagram of an illustrative computing environment 100 that includes a computing architecture for provision of risk information associated with compromised accounts. The environment 100 includes a computing system 102 associated with a service 104. The computing system 102 may include a server or a collection of servers in a distributed configuration (e.g., cloud computing service, server farm, etc.) or non-distributed configuration. The service 104 includes a set of related hardware/software functionalities that may be reused for different purposes, together with the policies that, for example, detect compromised accounts. A compromised account refers to a piece of user credential (e.g., user ID and password pair) which has been exposed to the public.

The service 104 may collect data related to compromised accounts and stored the data in a database 106. The service 104 may be implemented by the computing system 102 that further communicated with other devices such as a computing system 108 associated with a service 110 and a user device 112 associated with a user 114 via a network 116. The computing system 108 may include a server or a collection of servers in a distributed configuration (e.g., cloud computing service, server farm, etc.) or non-distributed configuration.

The network 116 may include wired and/or wireless networks that enable communications between the various computing devices described in environment 100. In some embodiments, the network 116 may include local area networks (LANs), wide area networks (WAN), mobile telephone networks (MTNs), and other types of networks, possibly used in conjunction with one another, to facilitate communication between the various computing devices (e.g., the computing system 102, the computing system 108, and the user device 112).

The service 110 includes a set of related hardware/software functionalities that may be reused for different purposes, together with the policies that enable various provisions such as online shopping, social networking, and other enterprise or business services. The service 110 may manage account data 118 that includes data of various user accounts.

In some implementations, the computing device may receive a login request 120 from the user device 112. The login request may include user credential, for example, including a user identifier (ID) 122 and a password 124 associated with the user ID 122. In some instances, the user ID 122 may include an email address, a phone number, or other information used to identify the user 114. For example, the user 114 may attempt to login to the service 110 using the user ID 122 (e.g., abc@a.com).

The service 110 may communicate with the service 104 to ensure security and safeguard. The computing system 108 may mark out the N characters of the user ID 122 to generate a modified user ID 126, and N can range, for example, anywhere from 2 to 4 depending upon the discretion of the service 110. For example, the first N characters of the user ID 122 may be marked when the user ID is an email address; the last N characters of the user ID 122 may be marked when the user ID is a phone number. As used herein, marking refers to "hiding," "replacing," "obscuring" or other operations that may be performed to anonymize the user ID 122.

For example, the user ID 122 may be visible as **c@a.com to the service 104 such that the user ID 122 remains confidential to the service 104. The modified user ID 126 is submitted to the computing system 102. The computing system 102 may use the modified user ID 126 to query the database 106, which stores huge amount of compromised account data. The computing system 102 may find one or more compromised records that match a pattern of the modified user ID 126. An individual record may include a user ID (e.g., an email ID), a password hash, salt, and one or more hash algorithms.

In some implementations, the service 104 may identify a record 130 that matches the modified user ID 126. The computing system 102 may return the record 130 to the service 110, which then determines whether an account associated with the user ID 122 is compromised. If the account is compromised, the computing system may generate a notification 128 and provide the notification 128 to the user device 112.

In some implementations, the user device 112 may communicate with the service 104 to evaluate whether an account of the user 114 is compromised. For example, the user device 112 may transmit a user ID 132 to the computing system 102, and the user ID 132 may be modified to obscure a portion of a real user ID of the user 114. Based on the user ID 132, the computing system 102 may determine whether an account ID shares a pattern of the user ID 132. The computing system 102 may provide a search result 134 to the user device 112.

In some embodiments, the service 104 may provide a modified password 136 to the service 110. The modified password 136 may be obtained by modifying an original password of a compromised account. For example, the original password may be modified to obtain a modified password by removing one or more characters from the password and provided to the service 110. In these instances, the computing system 108 may compare a password obtained by the service 110 against the modified password 136. For example, if the modified password 136 matches the password, the computing system 108 may determine that the password may be compromised.

An experiment on 50k accounts was performed to determine the modification of passwords and likelihoods of errors. It was found that, for a modified password of which the first and the last characters were kept, the error rate associated with password modifications and matches is lower than 0.1%, which is acceptable according to the industry standard. Further, the error rate is 0.25% if the first two characters of the password were kept. In these instances, information of the length of the password was kept.

In some embodiments, the service 104 may further encrypt the modified password 136 before providing to the service 110. For example, the modified password 136 may be further modified using a random initialization vector (IV) and an encryption algorithm (e.g., AES256). In some instances, to compare passwords, the computing system 108 may decrypt the modified password 136, for example, in a cache associated with the service 110. Accordingly, any decrypted content may not be stored on a permanent storage associated with the service 110.

In some embodiments, the computing system 108 may need to store the modified password 136 on a permanent storage associated with the service 110. If the modified password is a password hash, the computing device 108 may store the hash without a salt. If the modified password is encrypted, the computing device 108 may store the ciphertext without an IV. The computing device 108 may not store the password in plaintext. If the hash or the ciphertext are later stolen by a 3rd party, the 3rd party will not be able to recover plaintext of the password because stored information does not have the salt or the IV.

For example, the computing system 108 may obtain a user credential that comprises a user ID and a password that are associated with a user. The computing system 108 may anonymize the user ID by obscuring one or more letters of the user ID to generate, for example, the modified user ID 126. The computing system 108 may transmit the modified user ID 126 to the computing device 102. Further, the computing system 108 may receive the record 130 corresponding the modified user ID 126.

In some embodiments, the record 130 may include a compromised ID including unobscured letters of the user ID, a modified password, and a decryption algorithm associated with the encryption. In these instances, the compromised ID and the corresponding compromised password may be stored in the database 106. The modified password may be obtained by removing characters of a compromised password except for the first and the last character of the compromised password and by further performing an encryption operation on the compromised password using the computing device 102.

Further, the computing system 108 may determine whether the compromised ID of the record 130 matches the user ID. In response to a determination that the compromised ID of the record 130 matches the user ID, the computing system 108 may perform a decryption operation on the modified password 136 using the decryption algorithms to obtain a generated password. Further, the computing system 108 may determine whether the generated password matches the password. In response to a determination that the generated password matches the password, the computing system 108 may generate a notification based on the user credential, and the notification may indicate that an account associated with the user credential is compromised.

Figure 2:
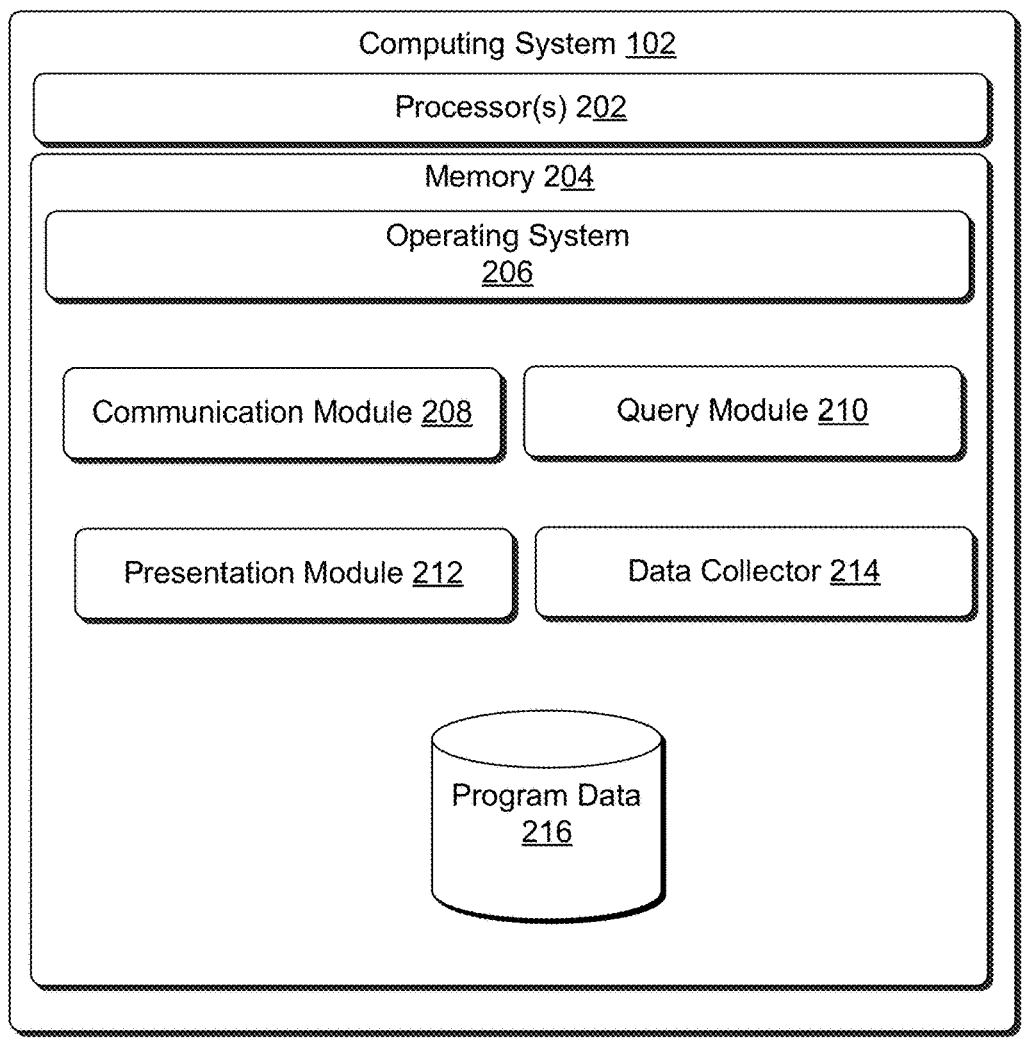
FIG. 2 is a schematic diagram of an illustrative computing architecture to enable provision of risk information associated with compromised accounts.

FIG. 2 is a schematic diagram of an illustrative computing architecture 200 to enable provision of risk information associated with compromised accounts. The computing architecture 200 shows additional details of the computing system 102, which may include additional modules, kernels, data, and/or hardware.

The computing architecture 200 may include processor(s) 202 and memory 204. The memory 204 may store various modules, applications, programs, or other data. The memory 204 may include instructions that, when executed by the processor(s) 202, cause the processor(s) 202 to perform the operations described herein for the computing system 102. The processors 202 may include one or more graphics processing units (GPU) and one or more central processing units (CPU).

The computing system 102 may have additional features and/or functionality. For example, the computing system 102 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, program data 216, or other data. The system memory, the removable storage, and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing system 102. Any such computer storage media may be part of the computing system 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or another mechanism. As defined herein, computer storage media does not include communication media.

The memory 204 may store an operating system 206 as well as a communication module 208, a query module 210, a presenting module 212, and a data collector 214.

The communication module 208 may be configured to receive information of the modified user ID 126 associated with the user 114 from the computing system 108.

In some implementations, the user ID 126 may include one or more obscured letters. For example, the user ID may include an email address of the user, and the ID may include the unobscured letters of the user ID.

The query module 210 may be configured to search the database 106 to identify a record (e.g., the record 130) based on the user ID 126. The database 106 includes a plurality of records associated with compromised accounts.

In some implementations, the record 130 may include a user ID matching a pattern of unobscured letters of the user ID 126, a hashed password corresponding to the user ID, and one or more hash algorithms associated with the hashed password. For example, the one or more hash algorithms may include at least one of BCrypt, MD5, or SHA1.

In some implementations, the one or more hash algorithms may include a first hash algorithm associated with the system and second hash algorithms associated with a third party system (e.g., online compromised accounts providers), and the hashed password have been hashed using the first hash algorithm and the second hash algorithm.

In some implementations, the information of the modified user ID 126 may include hashed information of the user ID 122. For example, the information may include a hash value derived from the user ID 122 using a predetermined hash algorithm (e.g., a cryptographic hash algorithm). For example, the computing system 108 may compute a hash operation on the user ID 122 to obtain the hash value and transmit the hash value to the computing system 102. In these instances, the computing system 102 may compute a hash operation on the database 106 using the predetermined hash algorithm to obtain a hashed database. The query module 210 may search the hashed database to identify the record 130 corresponding to the hash value from the hashed database.

After identifying the record 130, the communication module 208 may transmit the record 130 to the computing system 108, which may generate a user ID from the record 130 based on the predetermined hash algorithm. In these instances, the computing system 108 may further determine whether the user ID has been compromised.

In some implementations, the user ID 122 is an email address (e.g., Joe@abc.com) including a local part (i.e., Joe) and a domain part (i.e., abc.com). In these instances, the information of the modified user ID 126 may include the domain part of the email address without a local part of the email address. For example, the query module 210 may search the database 106 to identify the record 130 corresponding to the domain part (e.g., abc.com) of the email address (e.g., Joe@abc.com). Further, the communication module 208 may transmit the record 130 to the computing system 108. In these instances, the computing system 108 may further determine whether the user ID has been compromised.

Accordingly, the service 104 may receive a hashed user ID or a domain part of a user ID, and risks of exposure of sensitive data are further reduced.

The presenting module 212 may be configured to transmit information of the record 130 to the computing system 108. For example, the information of the identified record may include the user ID matching a pattern of unobscured letters of the user ID, the hashed password associated with the user ID, the one or more hash algorithms, and random data associated with the one or more hash algorithms.

The data collector 214 may be configured to collecting data associated with a plurality of compromised accounts. For example, an individual compromised account of the plurality of compromised accounts may include a compromised ID and a password associated with the compromised ID, and the compromised ID including a plurality of letters. The data collector 214 may further reverse the plurality of letters of the compromised ID to generate a reversed compromised ID, and perform an index operation on reversed compromised IDs of the plurality compromised accounts prior to the searching the database 106.

For example, when the login request 120 is made, the service 110 may anonymize an email ID associated with the user 114. The service 110 may mark the first N letters, and N can range from 2 to 4 first letter of the email. The marking ensures that email ID even remains anonymous to the service 104. The anonymized email is then reversed. Accordingly, a query along with the anonymized email is submitted to the database that contains a list of compromised accounts for checking and verification. If the user credential is not compromised, the service 104 may not find a record of any of the values. In these instances, an empty record may be sent to the service 110. If the user credential is compromised, the service 104 may send the record 130 to the service 110.

FIG. 3 is a diagram of an illustrative scheme that includes various records processed by a computing architecture illustrated in FIG. 1. In some implementations, a database structure of the database 106 may be represented using, for example, a table 302. For example, the number of rows or record depends upon the number of compromised accounts in the database 106. The first column is id, which is a unique id or primary key for the tuple. The second column or attribute is the reversed email; an email xyz@gmail.com may be stored in a reversed order like moc.liamg@zyx in the database. The reversing process facilitates indexing and anonymized query processing. A password may be stored in the form of the hashed value. The third column represents a salt value, namely random data that is used as an additional input to a one-way function that hashes a password or passphrase. The salt is used to safeguard the password against dictionary attacks and also against pre-computed rainbow table attacks. Further, one or more hash algorithms are stored in a column.

Figure 4:
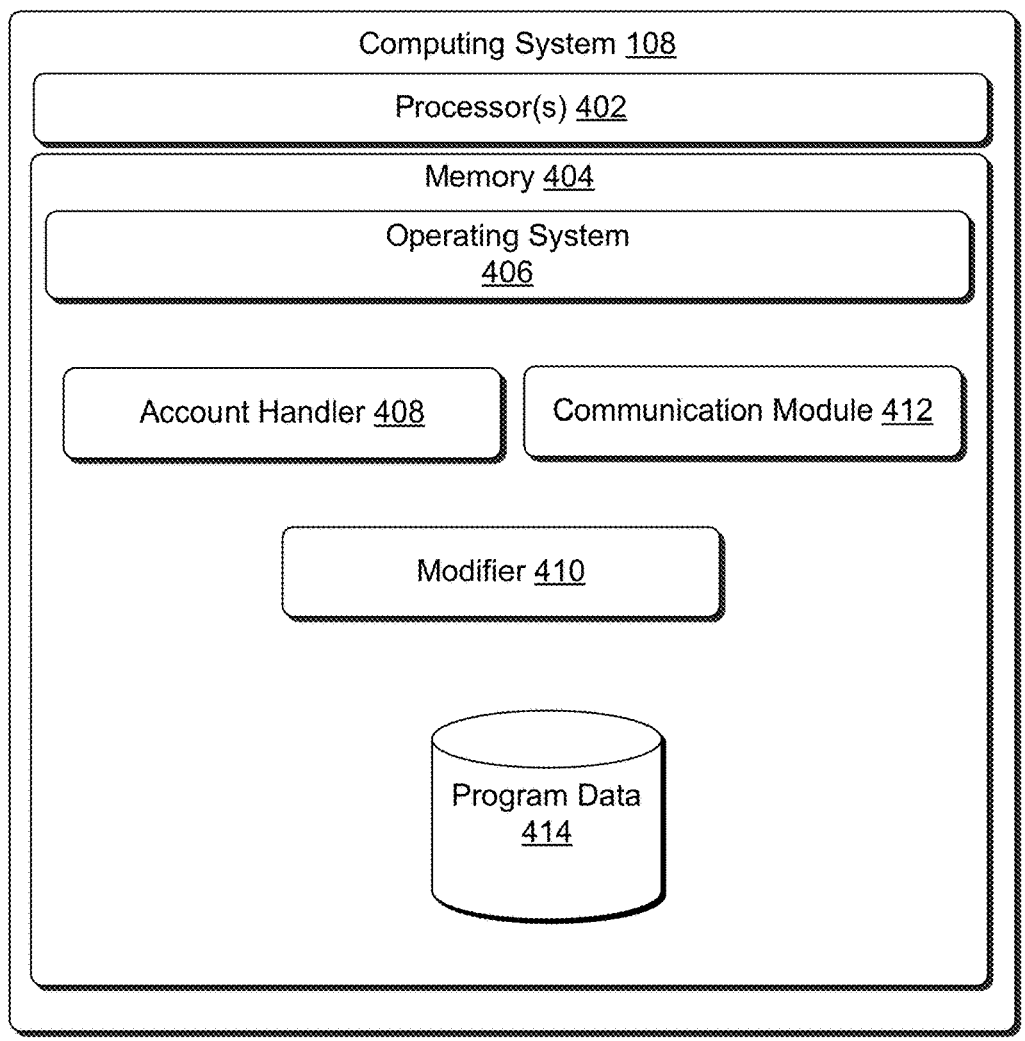
FIG. 4 is another schematic diagram of an illustrative computing architecture to enable provision of risk information associated with compromised accounts.

FIG. 4 is a schematic diagram of an illustrative computing architecture 400 to enable provision of risk information associated with compromised accounts. The computing architecture 400 shows additional details of the computing system 108, which may include additional modules, kernels, data, and/or hardware.

The computing architecture 400 may include processor(s) 402 and memory 404. The memory 404 may store various modules, applications, programs, or other data. The memory 404 may include instructions that, when executed by the processor(s) 402, cause the processor(s) 402 to perform the operations described herein for the computing system 108. The processors 402 may include one or more graphics processing units (GPU) and one or more central processing units (CPU).

The computing system 108 may have additional features and/or functionality. For example, the computing system 108 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, program data 414, or other data. The system memory, the removable storage, and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing system 108. Any such computer storage media may be part of the computing system 108. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or another mechanism. As defined herein, computer storage media does not include communication media.

The memory 404 may store an operating system 406 as well as an account handler 408, a modifier 410, and a communication module 412. The account handler 408 may be configured to receive, from a user device, a user credential that includes the user ID 122 and the password 124. The modifier 410 may modify the user ID 122 by obscuring one or more letters of the user ID 122 to generate the modified user ID 126.

The communication module 412 may transmit the modified user ID 126 to the computing system 102, and receive the record 130 corresponding the modified user ID 126. The record 130 may include a user ID including unobscured letters of the user ID 126, a hashed password corresponding to the ID, and one or more hash algorithms associated with the hashed password.

The account handler 408 may further determine whether the ID of the record matches the user ID 122. In response to a determination that the ID of the record 130 matches the user ID 122, the account handler 408 may perform a hash operation on the password 124 using the one or more hash algorithms of the received record 130 to generate a hashed password corresponding to the user ID 122.

The account handler 408 may further determine whether the generated hashed password corresponding to the user ID 122 matches the password corresponding to the ID. In response to a determination that the generated hashed password matches the password associated with the ID, the communication module 412 may generate the notification 128 based on the user credential. For example, the notification may indicate that an account associated with the user credential is compromised. The communication module 412 may further provide the notification to the user device 112.

In some implementations, when a login request is made, the service 110 may anonymize an email ID associated with the user 114. The service 110 may mark the first N letters, and N can range from 2 to 4 first letter of the email. The marking ensures that email ID even remains anonymous to the service 104. The anonymized email is then reversed. Accordingly, a query along with the reversed email is submitted to the database that contains a list of compromised accounts for checking and verification. If the user credential is not compromised, the service 104 may not find a record of any of the values. In these instances, an empty record may be sent to the service 110. If the user credential is compromised, the service 104 may send the record 130 to the service 110.

In these instances, the record 130 may include a user ID, salt and password hashes. Accordingly, after receiving the record 130, the service 110 may determine whether the user ID is matched with the user ID 122. If the user ID is not present in the account data 118 and a record match is not found, the service 110 may allow the user 114 to login on to the service 110. If the user ID is present in the account data 118, salt or the random text would be used to compute the password hash to evaluate the password. The password hash may be checked for availability in records. If the password hash is not found in the account data, the user 114 may be allowed to log in to the service 110. If the password hash is also found in the account data 118, the service may consider this account as a compromised account and report as a compromised account. Once an account is confirmed to be compromised, the service 110 may send a request to the user to, for example, initialize a password resetting process.

Figure 5:
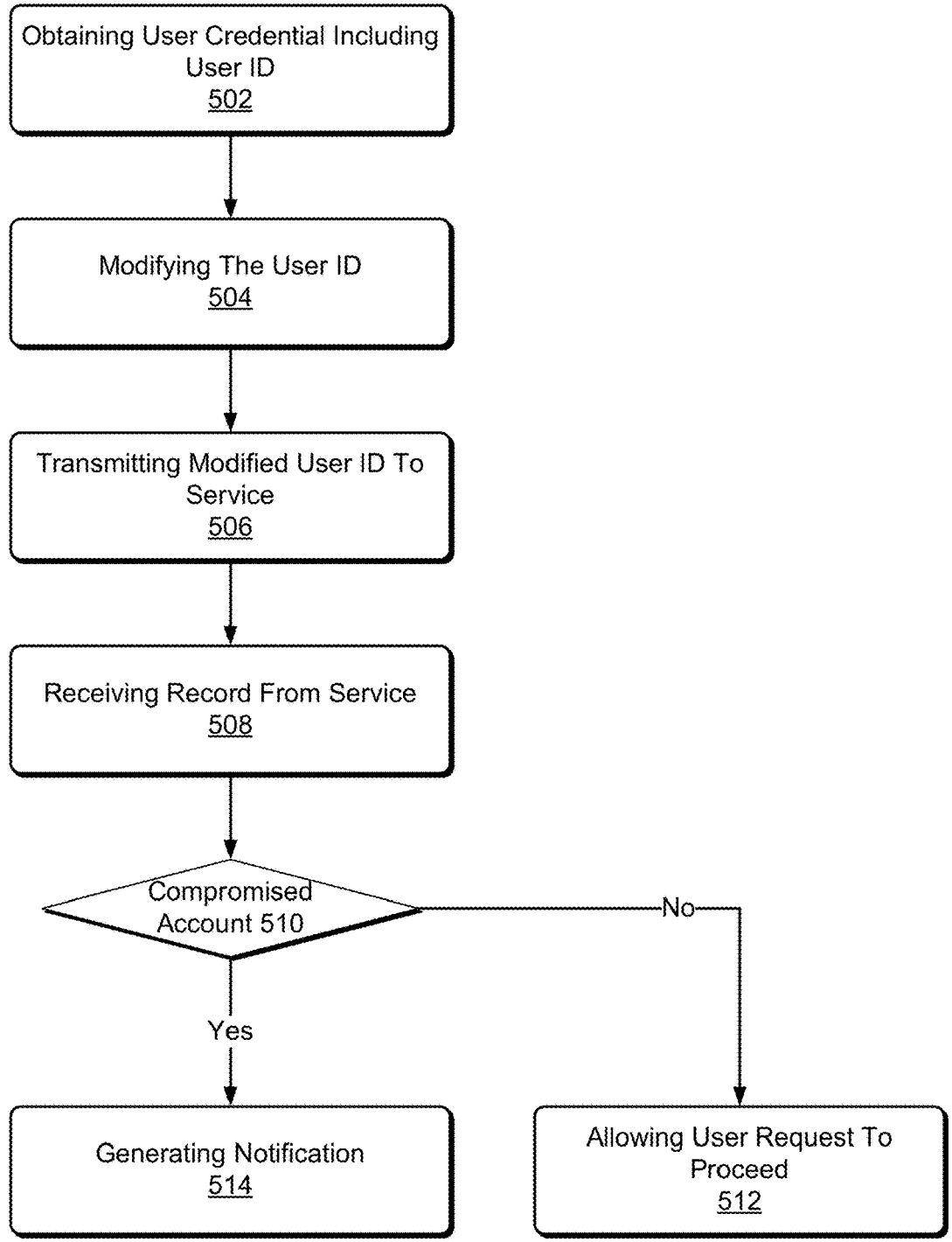
FIG. 5 is a flow diagram of an illustrative process for the provision of risk information associated with compromised accounts.

FIG. 5 is a flow diagram of an illustrative process 500 for the provision of risk information associated with compromised accounts. The process 500 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 500 is described with reference to the computing environment 100. However, the process 500 may be implemented using other schemes, environments, and/or computing architecture.

At 502, the computing system 108 may obtain a user credential including the user ID 122. For example, the user credential may include the password 124, and the user ID may include an email address and/or a phone number of the user 114.

In some implementations, the computing system 108 may further receive a login request including the user credential prior to obtaining the user credential. In some implementations, the computing system 108 may receive a query for a compromised record that indicates whether a user account is compromised and, the query may include the user credential.

At 504, the computing system 108 modifies the user ID 122 to anonymize the user ID 122 to generate the modified user ID 126. In these instances, the modified user ID 126 may include unobscured letters of the user ID 122. For example, the computing system 108 may anonymize the user ID 122 by obscuring one or more letters of the user ID 122.

At 506, the computing system 108 transmits the modified user ID 122 to the computing system 102. In some implementations, the computing system 108 may determine a user account for a compromising evaluation in a predetermined time period, and the user account corresponds to the user credential. In these instances, the computing system 108 may transmit random data associated with a hash to the computing device associated with the service 104. For example, the computing system 102 may receive the random data and search the database 106 based on the hashed password that is generated by the random data and the hash.

At 508, the computing system 108 may receive the record 130 corresponding to the modified user ID 126 that includes information of a compromised account. For example, the record 130 may include an identified ID corresponding to the modified user ID 126, a hashed password corresponding the ID, and one or more hash algorithms associated with the hashed password. For example, the one or more hash algorithms may include at least one of BCrypt, MD5, or SHA1.

In some implementations, the one or more hash algorithms may include a first hash algorithm associated with the security service provider and second hash algorithms associated with a third party system. In these instances, the hashed password has been hashed using the first hash algorithm and the second hash algorithm. In some implementations, the record 130 may further include random data associated with the one or more hash algorithms.

At 510, the computing system 108 may determine whether an account of the user ID 122 is compromised based on the received record 130. For example, the computing system 108 may determine whether the account of the user ID 122 is compromised based on the ID corresponding to the modified user ID 126, the hashed password associated with the ID, and one or more hash algorithms associated with the hashed password.

In some implementations, the computing system 108 may determine that the identified ID matches the user ID, and then perform a hash operation on the password 124 to generate a hashed user password corresponding to the user ID 122. The computing system 108 may determine whether the hashed user password corresponding to the user ID 122 matches the hashed password associated with the identified ID in the record 130.

In response to a determination that the identified ID does not match the user ID 122 (the "No" branch of the operation 510), the computing system 108 may allow the user 114 to proceed the login process at 512. In some implementations, the computing system 108 may label the account as uncompromised.

In response to a determination that the identified ID matches the user ID 122 (the "Yes" branch of the operation 510), the computing system 108 may generate the notification 128 based on the user credential at 514 and provide the notification 128 to the user 114. For example, the notification 128 may indicate that an account associated with the user credential is compromised.

In some implementations, the computing system 108 obtains the user ID 122 and the password 124 from the user device 112 or the account data 118. The computing system 108 then anonymizes the user ID 1122 by obscuring N letters of the user ID 122 and sends the modified user ID 126 to the computing system 102. The computing system 102 uses the modified user ID 126 to query the database 106 including a large amount of compromised account data and to identify the records which match a pattern of the modified user ID 126. Each record includes a user ID, password hash, salt, and hash algorithm. The retrieved records (e.g., the record 130) then are sent back to the computing system 102 to the computing system 108, which further uses the real user ID (e.g., the user ID 122) to check whether there are records with the same user ID. If a match is found, the computing system 108 gets the salt and hash algorithm from the corresponding record and compute the hash with the password 124. If this hash matches the password hash in the record, the computing system 108 reports to the service 110 that a compromise has been detected. Because the computing system 108 is inside or under the control of the service 110, the password 124 may not be exposed to any $3^{rd}$ party and the service 104.

In these instances, the service 104 communicates with the service 110 in an anonymized manner, and the service 104 is not aware of exact user IDs. The service 110 marks the three letters of the login ID, and the service 104 is unable to know the exact user IDs. The anonymous id not only facilitates in maintaining the privacy of users but is a mechanism of safeguard against phishing attacks. The security is further strengthened against any "brute force" attack aimed at guessing the output of these algorithms by the application of salt technique. For example, some random data may be added to the hashed word, and the output of password hash algorithm and the random salt data may be hashed in a one-dimensional one-way hash process to a secure and theft resistant password. Hence a hash algorithm or salted hashed passwords are generated. This is the process make the user ID 122 and the password 124 secured.

Figure 6:
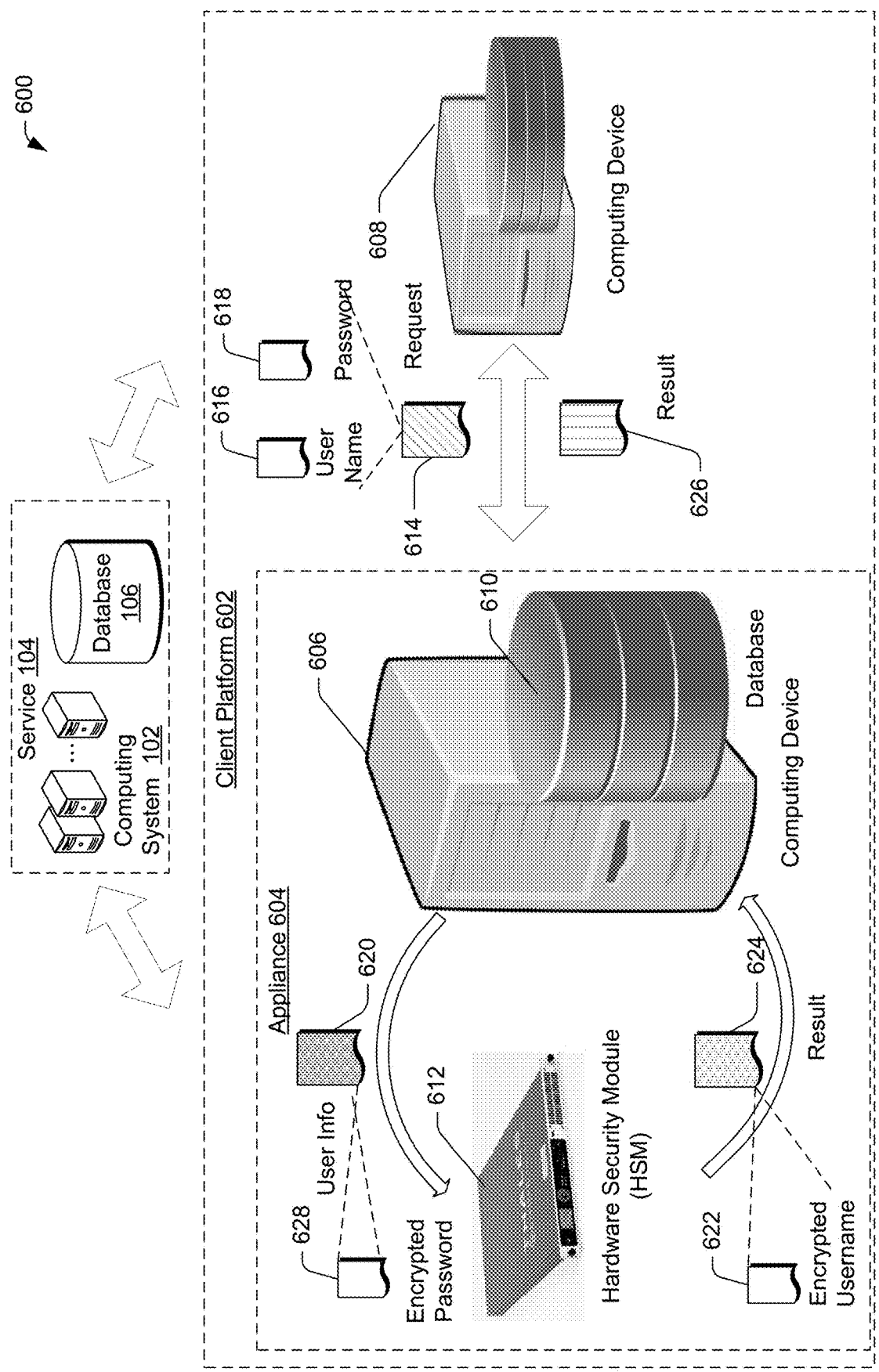
FIG. 6 is another diagram of an illustrative computing environment that includes a computing architecture for on-site provision of risk information associated with compromised accounts.

Some implementations relate to systems and methods for on-site provision of risk information associated with compromised accounts. FIG. 6 is a diagram of an illustrative computing environment 600 that includes a computing architecture for on-site provision of risk information associated with compromised accounts. The environment 600 includes the service 104 and a client platform 602, which include hardware and software that enable detection of compromised accounts associated with a client (e.g., an enterprise). The service 104 may provide services associated with the on-site provision of risk information associated with compromised accounts to the client.

In some implementations, the client platform 602 may include an appliance 604, which configured to receive, via a computing device 606, queries from a computing device 608 and provide results in response to the queries. The appliance 604 may include the computing device 606, a database 610 and a hardware security module (HSM) 612. In some embodiments, functionalities of the HSM 612 may be implemented by Intel SGX (Software Guard Extensions) associated with the computing device 606. The database 610 may include data associated with compromised accounts. As illustrated in FIG. 7, an example of the database 610 includes a table 700. Table 700 includes information such as various index numbers 702, corresponding encrypted username 704, and corresponding encrypted password 706. For example, usernames and passwords may be encrypted with an algorithm (e.g., AES256). In some implementations, usernames may be encrypted such that same usernames have the same encrypted username. In these instances, the usernames in table 700 may be used as looked-ups. In some implementations, passwords in table 700 may be encrypted such that the same passwords have different encrypted passwords.

Turning back to FIG. 6, the computing device 608 may transmit a request 614 to the computing device 606. The request 614 may include a username 616 and a password 618. In some implementations, the username may be in the form of plain text, and the password 618 may be in the form of plain text or encrypted text.

After the computing device 606 receives the request 614, the computing device 606 may query the database 610 to determine whether the username 616 corresponds to a username of a compromised account. In some implementations, the computing device may transmit user information 620 to the HSM 612. In these instances, the user information 620 includes the username 616, which may then encrypt the username 616 using a predetermined algorithm to obtain an encrypted username 622. The HSM 612 may transmit a result 624, which includes the encrypted username 622 to the computing device 606. The computing device 606 may further query the database 610 to determine whether the username 622 corresponds to an encrypted username of a compromised account. If the username 622 does not correspond to an encrypted username of a compromised account, the computing device 606 may transmit a result 626 to the computing device, and the result 626 may indicate that the account associated with the username is not compromised.

In some implementations, the computing device 606 may determine that the username 622 corresponds to an encrypted username of a compromised account. In these instances, the computing device 606 may identify and retrieve an encrypted password 628 corresponding to the username 616 from the database 610. Further, the computing device 606 may transmit the user information 620 to the HSM 612, and the user information 620 may include the password 618 and the encrypted password 628.

The HSM 612 may compare the password 618 and the encrypted password 628 and return the result 624 to the computing device 606. The result 624 indicates whether the password 618 and the encrypted password 628 are the same. If the password 618 is plain text, the HSM 612 may encrypt the password 618 using a predetermined algorithm and compare the HSM encrypted password to the encrypted password 628. Alternatively, the HSM 612 may decrypt the encrypted password 628 and compare the decrypted encrypted password 628 with the password 618. If the password 618 is a hashed password, the HSM 612 may decrypt the encrypted password 628 and compare the decrypted encrypted password 628 with the password 618. For example, the HSM 612 may encrypt the decrypted encrypted password 628 using a predetermined hashing algorithm to obtain an HSM hashed password and then compare the password 618 with the HSM hashed password.

If the HSM 612 determines that the password 618 corresponds to the encrypted password 628, the computing device 606 may transmit, to the computing device 608, the result 626, which indicates that the account associated with the username 616 is compromised. If the HSM 612 determines that the password 618 does not correspond to the encrypted password 628, the computing device 606 may transmit, to the computing device 608, the result 626, which indicates that the account associated with the username 616 is not compromised.

In some implementations, the service 104 may communicate with the client platform 602 via the network 116. For example, the service 104 may update the database 610 in a predetermined time period. In certain implementations, the service 104 may not obtain certain information associated with the client platform 602, such as the username 616 and the password 618. In these instances, the client may not obtain a secret key for the decryption and encryption of usernames and passwords that are stored in the database 610.

In some implementations, the computing device 606 may include one or more processors, and memory to maintain a plurality of components executable by the one or more processors. In some implementations, the plurality of components may include a compromised account detection application configured to receive the request 614 for detection of a compromised account from the computing device 608, and the request may include the username 616 and the password 618 corresponding to the username 616. The compromised account detection application may be configured to further transmit the username 616 to the HSM 612 such that the username 616 is encrypted by the HSM 612 to obtain the encrypted username 622, receive the encrypted username 622 from the HSM 612, and query the database 610 to determine whether the database 610 includes the encrypted username 622.

In some implementations, the compromised account detection application may determine that the database 610 includes the encrypted username 622. In these instances, the compromised account detection application may determine the encrypted password 628 corresponding to the encrypted username 622 in the database 610, and transmit the encrypted password 628 to the HSM 612 such that the HSM 612 determines whether the encrypted password 628 corresponds to the password 618. In response to a determination that the encrypted password 628 corresponds to the password 618, the compromised account detection application return the result 626 to the computing device, and the result 626 may indicate that an account corresponding to the username 616 is compromised. In response to a determination that the encrypted password does not correspond to the password, the compromised account detection application may return the result 626 to the computing device 608, and the result 626 may indicate that an account corresponding to the username is not compromised.

In some implementations, the compromised account detection application may determine that the database 610 does not include the encrypted username 622, the compromised account detection application may return the result 626 to the computing device, and the result 626 may indicate that an account corresponding to the username 616 is not compromised.

In some implementations, the computing device 608 is associated with a client that desires to determine whether the account is compromised, and wherein the database 610 is updated in a predetermined time period by the computing system 102 associated with the service 104 that determines whether the account is compromised.

In some implementations, the database 610 includes usernames and passwords corresponding to the usernames, and the usernames and the passwords are encrypted. In some implementations, the usernames and the passwords are encrypted such that same usernames have a same encrypted username, and same passwords have different encrypted passwords.

In some implementations, the HSM 612 determines whether the encrypted password 628 corresponds to the password 618 by encrypting the password 618 to generate an HSM encrypted password and comparing the HSM encrypted password with the encrypted password 628. In some implementations, the HSM 612 determines whether the encrypted password 628 corresponds to the password by decrypting the encrypted password 628 to generate an HSM decrypted the password, and comparing the HSM decrypted password with the password 618. In some implementations, the password is a password in plain text or a hashed password.

Examples of pseudo code implemented by the computing device 606 and associated with some implementations described above are provided as follow.

```
string check_compromise1(string username,string password) {
    encrypted_username = HSM::encrypt_username(username)
    encrypted_passwords =
search_database_with_encrypted_username(encrypted_username)
    foreach (encrypted_password in encrypted_passwords) {
        result = HSM:: check_password1(encrypted_password,password)
        if (result == 'yes') {
            return PASSWORD_COMPROMISED
        }
    }
    return PASSWORD_NOT_COMPROMISED
}
string check_compromise2(string username,string hashed_password) {
    encrypted_username = HSM:: encrypt_username(username)
    encrypted_passwords =
search_database_with_encrypted_username(encrypted_username)
    foreach (encrypted_password in encrypted_passwords) {
        result = HSM:: check_password2(encrypted_password,hashed_password)
        if (result == 'yes') {
            return PASSWORD_COMPROMISED
        }
    }
    return PASSWORD_NOT_COMPROMISED
}
```

In some implementations, the HSM 612 may include one or more dedicated cryptographic processors, and memory to maintain a plurality of components executable by the one or more processors to perform the following acts. The HSM 612 may receive the username 616 in plaintext and encrypt the username 616 using a first predetermined algorithm to obtain an HSM encrypted username. The HSM 612 may further transmit the HSM encrypted username to the computing device 606 such that the computing device 606 may determine the encrypted password 628 corresponding to the HSM encrypted username in the database 610, receive the encrypted password 628 and the password 618 corresponding to the username 616, and determine whether the encrypted password 628 corresponds to the password 618. In response to a determination that the encrypted password 628 corresponds to the password 618, the HSM 612 may transmit the result 624 to the computing device 606, and the result 624 may determine that an account associated with the username 616 is compromised. In response to a determination that the encrypted password 628 does not correspond to the password 618, the HSM 612 may transmit the result 624 to the computing device 606, and the result 624 may indicate that an account associated with the username 616 is not compromised. The computing device 606 may transmit the result 626 to the computing device 608, and the result 626 may indicate that an account associated with the username 616 is compromised or not based on the result 624 received by the computing device 606.

In some implementations, the password 618 is a password in plain text or a hashed password. In some implementations, the HSM 612 may determine whether the encrypted password 628 corresponds to the password 618 by determining that the password 618 is plain text, encrypting the password 618 using a second predetermined algorithm to obtain an HSM encrypted password, and determining whether the encrypted password 628 corresponds to the password 618 by comparing the HSM encrypted password with the encrypted password 628.

In some implementations, the HSM 612 may determine whether the encrypted password 628 corresponds to the password 618 by determining that the password 618 is plain text, decrypting the encrypted password 628 using a predetermined algorithm to obtain an HSM decrypted password, and determining whether the encrypted password 628 corresponds to the password 618 by comparing the HSM decrypted password with the password 618.

In some implementations, the HSM 612 may determine whether the encrypted password 628 corresponds to the password 618 by determining that the password 618 is a hashed password, decrypting the encrypted password 628 using a predetermined algorithm to obtain a HSM decrypted password, encrypting the HSM decrypted password using a predetermined hash algorithm to obtained an HSM hashed password and determining whether the encrypted password 628 corresponds to the password 618 by comparing the HSM hashed password with the hashed password.

In some implementations, the database 610 may include usernames and passwords corresponding to the usernames, the usernames, and the passwords are encrypted, and the usernames and the passwords are encrypted such that same usernames have a same encrypted username, and same passwords have different encrypted passwords.

In some implementations, algorithms used for encryption and/or decryption may be predetermined by the service 104 and the client platform 602. For example, the hashing algorithm used for generating the HSM hashed password may be predetermined by the service 104 and the client platform 602.

Examples of pseudo code implemented by the HSM 612 and associated with some implementations described above are provided as follow.

Function 1 in HSM

```
string encrypt_username(string username) {
    encrypted_username = AES256_encrypt(username)
    return encrypted_username
}
```

Function 2 in HSM

```
boolean check_password1(string encrypted_password,string password) {
    plaintext = AES256_decrypt(encrypted_password)
    return plaintext == password
}
```

Function 3 in HSM

```
boolean check_password2(string encrypted_password,string hashed_password) {
    plaintext = AES256_decrypt(encrypted_password)
    return verify_hash(plaintext,hashed_password)
}
```

Figure 8:
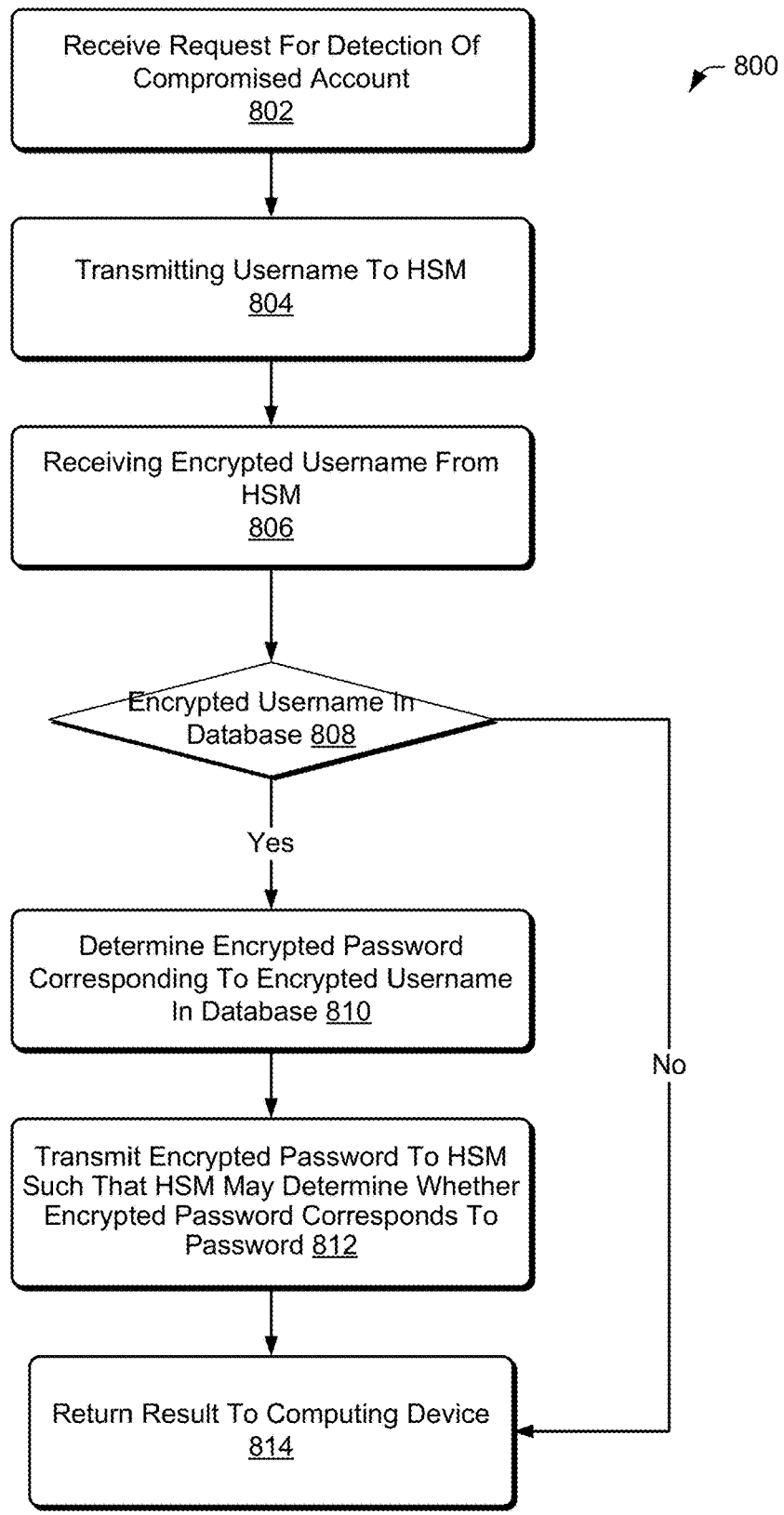
FIG. 8 is a flow diagram of an illustrative process for the on-site provision of risk information associated with compromised accounts.

FIG. 8 is a flow diagram of an illustrative process 800 for the on-site provision of risk information associated with compromised accounts. The process 800 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 800 is described with reference to the computing environment 600. However, the process 800 may be implemented using other schemes, environments, and/or computing architecture.

At 802, the computing device 606 may receive the request 614 for detection of a compromised account from the computing device 608. For example, the request 614 may include the username 616 and the password 618 corresponding to the username 616.

At 804, the computing device 606 may transmit the username 616 to the HSM 612 such that the username 616 is encrypted by the HSM 612 to obtain the encrypted username 622.

At 806, the computing device 606 may receive the encrypted username 622 from the HSM.

At 808, the computing device 606 may query the database 610 to determine whether the database 610 includes the encrypted username 622.

In response to a determination that the database 610 includes the encrypted username 622, the computing device 606 may determine the encrypted password 628 corresponding to the encrypted username in the database 610 at 810, and transmit the encrypted password 628 to the HSM 612 such that the HSM 612 may determine whether the encrypted password 628 corresponds to the password 618 at 812.

In response to a determination that the encrypted password 628 corresponds to the password 618, the computing device 606 may return the result 626 to the computing device 608 at 814. In these instances, the result 626 may indicate that an account corresponding to the username 616 is compromised.

In response to a determination that the encrypted password 628 does not correspond to the password 618, the computing device 606 may return the result 626 to the computing device 608 at 814. In these instances, the result 626 may indicate that an account corresponding to the username 616 is not compromised, and In response to a determination that the database includes the encrypted username 622, the computing device 606 may return the result 626 to the computing device 608 at 814. In these instances, the result 626 may indicate that the account corresponding to the username 616 is not compromised.

In some implementations, the compromised account detection application may determine that the database 610 does not include the encrypted username 622, the compromised account detection application may return the result 626 to the computing device, and the result 626 may indicate that an account corresponding to the username 616 is not compromised.

In some implementations, the computing device 608 is associated with a client that desires to determine whether the account is compromised, and wherein the database 610 is updated in a predetermined time period by the computing system 102 associated with the service 104 that determines whether the account is compromised.

In some implementations, the database 610 includes usernames and passwords corresponding to the usernames, and the usernames and the passwords are encrypted. In some implementations, the usernames and the passwords are encrypted such that same usernames have a same encrypted username, and same passwords have different encrypted passwords.

In some implementations, the HSM 612 determines whether the encrypted password 628 corresponds to the password 618 by encrypting the password 618 to generate an HSM encrypted password and comparing the HSM encrypted password with the encrypted password 628. In some implementations, the HSM 612 determines whether the encrypted password 628 corresponds to the password by decrypting the encrypted password 628 to generate an HSM decrypted the password, and comparing the HSM decrypted password with the password 618. In some implementations, the password is a password in plain text or a hashed password.

Figure 9:
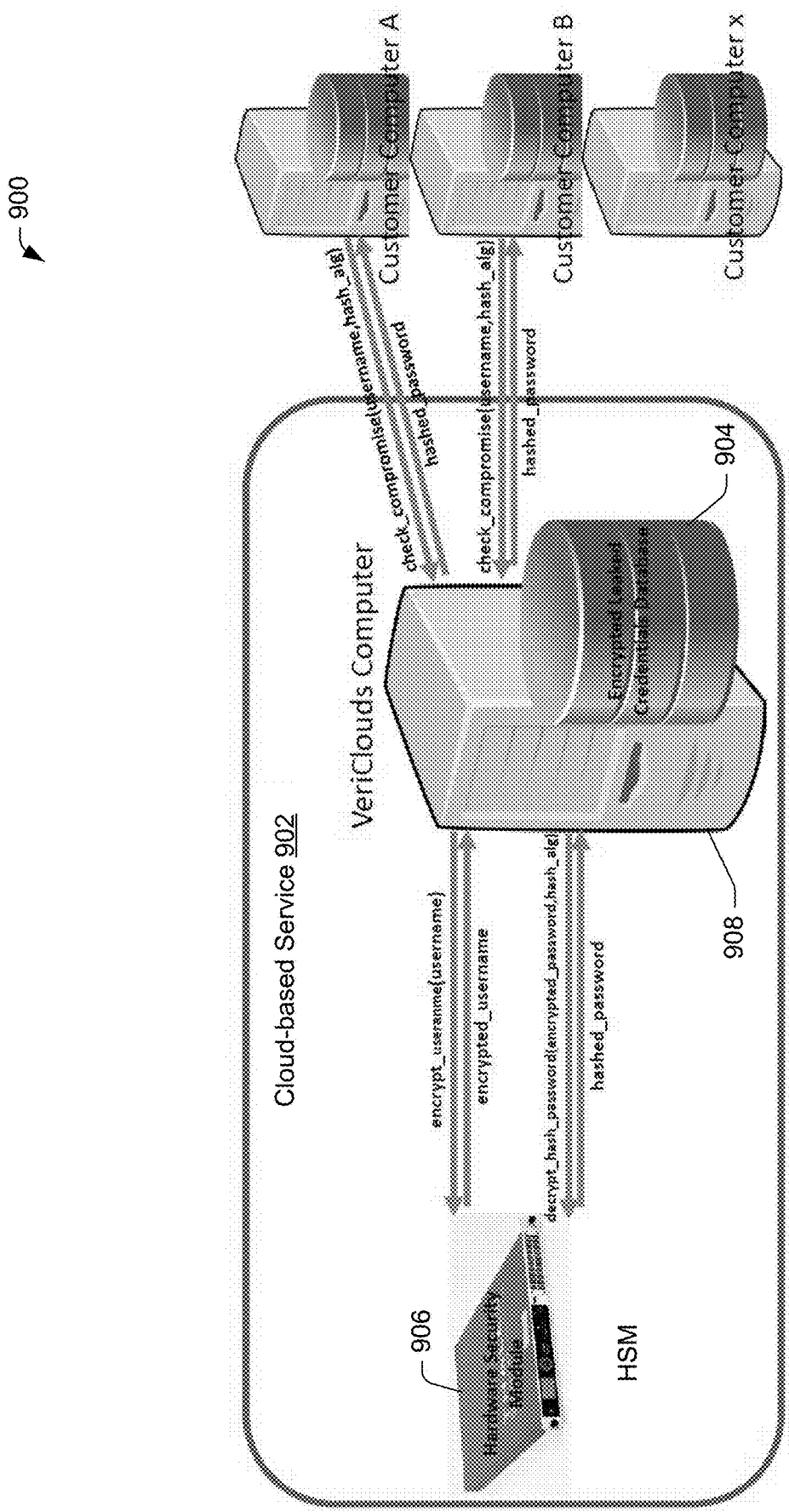
FIG. 9 is yet another diagram of an illustrative computing environment that includes a computing architecture for cloud-based provision of risk information associated with compromised accounts.

FIG. 9 is a diagram of an illustrative computing environment 900 that includes a computing architecture for cloud-based provision of risk information associated with compromised accounts. Some implementations described above may be performed by a cloud-based service 902. For example, the cloud-based service 902 may include a combination of hardware and software to query an encrypted leaked credentials database 904 (e.g., the database 610), perform encryption and/or decryption, perform a comparison of usernames and/or passwords. The cloud-based service 902 may include various devices such as a HSM 906 (e.g., the HSM 612) and a computing device 908 (e.g., the computing device 606), which may communicate with various customer computers (e.g., customer computers A, B, and C) to receive a request for detection of a compromised account and to return a result indicating whether the account is compromised.

Figure 10:
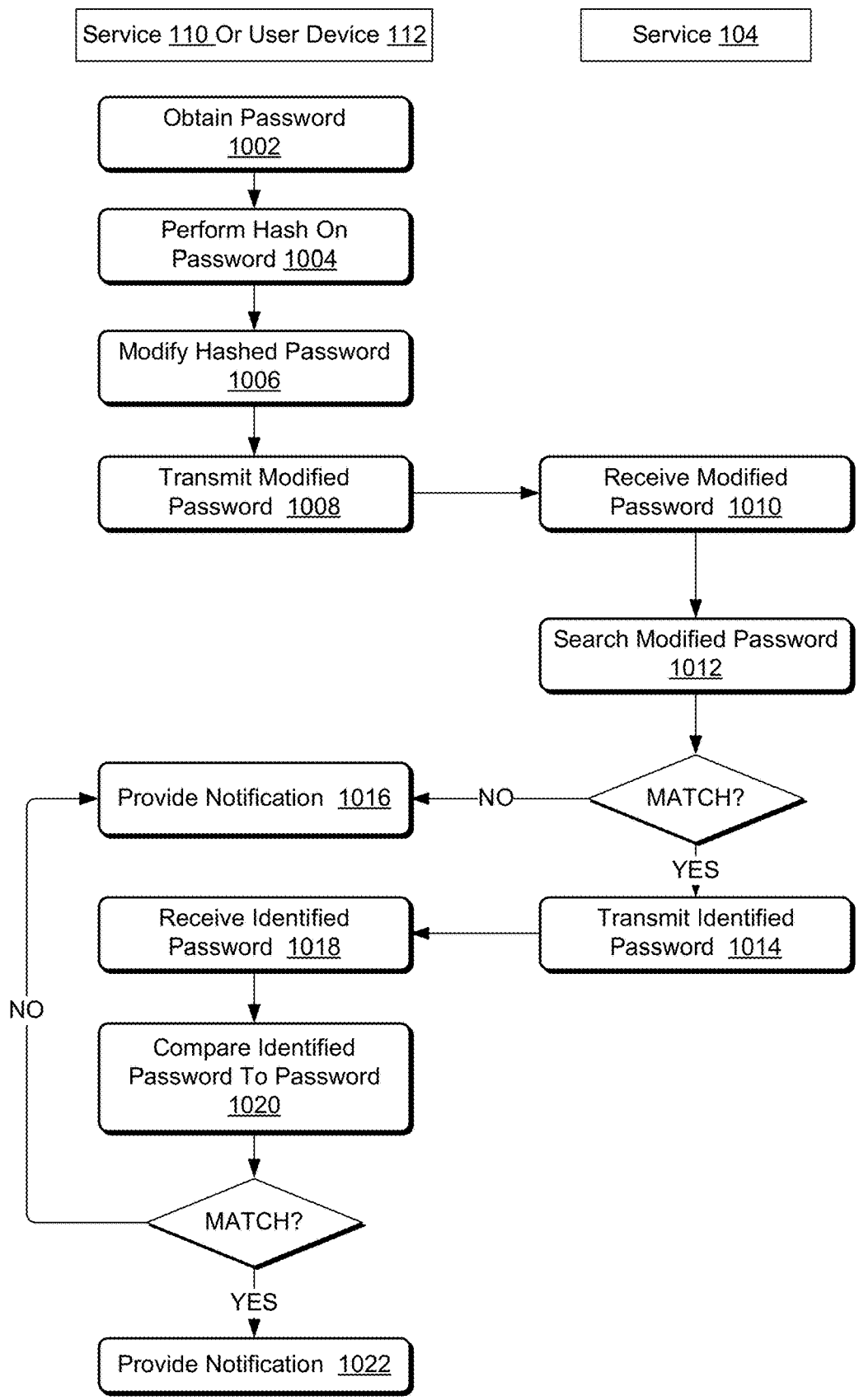
FIG. 10 is another flow diagram of an illustrative process for the on-site provision of risk information associated with compromised accounts.

FIG. 10 is a flow diagram of an illustrative process 1000 for the on-site provision of risk information associated with compromised accounts. The process 1000 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 1000 is described with reference to the computing environment 100, 600 and/or 900. However, the process 1000 may be implemented using other schemes, environments, and/or computing architecture.

At 1002, one or more processors of the computing system 108 or the user device 112 may obtain the password 124 of the user 114.

At 1004, the one or more processors may perform a hash operation on the password 124 using a predetermined hash algorithm to obtain a hashed password. The predetermined hash algorithm may include MD5, SHA1, SHA256. For example, the hashed password is a string, which includes a sequence of characters.

At 1006, the one or more processors may modify the hashed password to obtain the modified password 136 in a certain manner, which may be similar to those described here regarding modification of the user ID 126. In some embodiments, the modified password 136 may include a part of the sequence of characters, for example, the first 6 characters of the hashed password of the password 124.

At 1008, the one or more processors may transmit the modified password 136 to the service 104.

At 1010, one or more processors of the computing system 102 may receive the modified password and information of the predetermined hash algorithm. The one or more processors may perform the hash operation on passwords of compromised accounts stored in the database 106 using the predetermined hash algorithm to obtain multiple hashed passwords.

At 1012, the one or more processors may search the modified password 136 against the multiple hashed passwords to identify one or more hashed password including the modified password 136. If the one or more processors do not identify any matched hashed password, the one or more processors may transmit a message to the service 104, which may then provide a notification indicating that the password 124 is not compromised based on currently available data at 1016.

At 1014, the one or more processors may transmit information of the identified one or hashed passwords to the service 104. For example, the information of the identified one or more hashed passwords may include the password(s) corresponding to the identified one or more hashed passwords.

At 1018, the one or more processors of the computing system 108 or the user device 112 may receive the information of the identified one or hashed passwords.

At 1020, the one or more processors may compare the information of the identified one or hashed passwords to the password 124.

If the information of the identified one or more hashed passwords matches to the password 124 (e.g., identical passwords), the one or more processors may provide a notification indicating that the password 124 is compromised at 1022. If the information of the identified one or more hashed passwords does not match to the password 136, the one or more processors may provide a notification indicating that the password 124 is not compromised based on currently available data at 1016.

Implementations

1. A system comprising: one or more processors; and memory to maintain a plurality of components executable by the one or more processors, the plurality of components comprising: a communication module configured to receive information associated with a user ID of a user from a computing device, a query module configured to search a database to identify a record based on the user ID, the database comprising a plurality of records associated with compromised accounts, and a presenting module configured to transmit information of the identified record to the computing device.

2. The system of implementation 1, wherein the information associated with the user ID comprises a hash value derived from the user ID using a predetermined hash algorithm.

3. The system of implementation 2, wherein the database is generated by computing a hash on a database including multiple records of compromised accounts using the predetermined hash algorithm, and the searching the database to identify the record based on the user ID comprises searching the database to identify the record based on the hash value.

4. The system of implementation 1, wherein the user ID is an email address comprising a local part and a domain part, and the information associated with the user ID comprises a domain part of the email address without a local part of the email address.

5. The system of implementation 4, wherein the searching the database to identify the record based on the user ID comprises searching the database to identify the record based on the domain part of the email address.

6. The system of implementation 1, wherein the identified record comprises: an ID matching a pattern of unobscured letters of the user ID, a hashed password corresponding to the ID, and one or more hash algorithms associated with the hashed password, the user ID comprises an email address of the user, and wherein the ID comprises the unobscured letters of the user ID.

7. The system of implementation 6, wherein the one or more hash algorithms comprise at least one of BCrypt, MD5, or SHA1.

8. The system of implementation 6, wherein the one or more hash algorithms comprises a first hash algorithm associated with the system and second hash algorithms associated with a third party system, and the hashed password has been hashed using the first hash algorithm and the second hash algorithm.

9. The system of implementation 6, wherein the plurality of components further comprises a data collector configured to: collect data associated with a plurality of compromised accounts, an individual compromised account of the plurality of compromised accounts comprising a compromised ID and a password associated with the compromised ID, and the compromised ID comprising a plurality of letters; reverse the plurality of letters of the compromised ID to generate a reversed compromised ID; and perform an index operation on reversed compromised IDs of the plurality compromised accounts prior to the searching the database.

10. The system of implementation 6, wherein the information of the identified record comprises the ID matching a pattern of unobscured letters of the user ID, the hashed password associated with the user ID, the one or more hash algorithms, and random data associated with the one or more hash algorithms.

11. A method for detection of compromised user accounts, the method comprising: modifying, by one or more processors, a user ID to encrypt the user ID; transmitting, by the one or more processors, the modified user ID to a computing device associated with a security service provider; receiving, by the one or more processors from the computing device associated with the security service provider, a record corresponding to the modified user ID that comprises information of a compromised account; and determining, by the one or more processors, whether an account of the user ID is compromised based on the received record.

12. The method of implementation 11, wherein the modified user ID comprises a hash value derived from the user ID using a predetermined hash algorithm.

13. The method of implementation 12, wherein the information of the compromised account is hashed using the predetermined hash algorithm.

14. The system of implementation 11, wherein the user ID is an email address comprising a local part and a domain part, and the information associated with the user ID comprises a domain part of the email address without a local part of the email address.

15. The method of claim 11, wherein the record comprises an ID corresponding to the modified user ID; a hashed password corresponding the ID; and one or more hash algorithms associated with the hashed password.

16. The method of implementation 15, wherein the determining whether the account of the user ID is compromised based on the received record comprises determining whether the account of the user ID is compromised based on the ID corresponding to the modified user ID, the hashed password associated with the ID, and one or more hash algorithms associated with the hashed password.

17. The method of implementation 15, wherein the modifying the user ID to anonymize the user ID comprises anonymizing the user ID by obscuring one or more letters of the user ID, and wherein the anonymized user ID comprises unobscured letters of the user ID.

18. The method of implementation 17, wherein the determining whether the account of the user ID is compromised based on the received record comprises: determining that the ID matches the user ID; performing a hash operation on the password of the user to generate a hashed user password corresponding to the user ID; and determining whether the hashed user password corresponding to the user ID matches the hashed password associated with the ID.

19. The method of implementation 18, further comprising in response to a determination that the hashed user password of the user ID matches the hashed password associated with the ID: generating a notification based on a user credential, the notification indicating that an account associated with the user credential is compromised, and providing the notification to the user.

20. The method of implementation 15, further comprising: receiving a login request comprising the user credential; receiving a query for a compromised record that indicates whether a user account is compromised, the query comprising a user credential; or determining a user account for a compromising evaluation in a predetermined time period, the user account corresponding to the user credential, and transmitting random data associated with a hash to the computing device associated with the security service provider.

21. A method for managing detection of compromised online accounts, the method comprising: receiving, by one or more processors of a computing device from a server, a binding request for binding a pseudo account ID to a first user ID of a user, the pseudo account ID corresponding to a second user ID used by the user to access the social network service; generating, by the one or more processors, a verification code in response to the binding request; transmitting, by the one or more processors, the verification code to a user device associated with the user using the first user ID; receiving, by the one or more processors, confirmation of the verification code from the server; associating, by the one or more processors, the first user ID and the pseudo account ID; storing, by the one or more processors, association between the first user ID and the pseudo account ID; monitoring, by the one or more processors, compromised status of one or more online accounts associated with the first user ID; receiving, by the one or more processors, a search request for searching compromised online accounts associated with the first user ID; determining, by the one or more processors, whether the search request includes information of the pseudo account ID; in response to a determination that the search request includes the information of the pseudo account ID, providing, by the one or more processors, a report of the compromised status of the one or more online accounts associated with the first user ID; and in response to a determination that the search request does not include the information of the pseudo account ID, declining, by the one or more processors, the search request.

22. A computing system comprising: one or more processors; and memory to maintain a plurality of components executable by the one or more processors, the plurality of components comprising: a communication module configured to receive, from a service, a query for compromised status of one or more online accounts, the query comprising a first user ID associated with the one or more online accounts and a second user ID generated by the service to represent a user; an account manager configured to search a database to determine a relationship between the first user ID and the second user ID in the database; and a query module configured to provide a service of compromised status of the one or more online accounts based on the relationship.

23. The system of implementation 22, wherein the account manager is further configured to determine that the first user ID corresponds to the second user ID in the database, and a presentation module is configured to generate a report of compromised status of the one or more accounts and provide the report to the user.

24. The system of implementation 22, wherein the account manager is further configured to: determine that the first user ID does not correspond to the second user ID in the database; and determine whether the first user ID corresponds to a third user ID in the database.

25. The system of implementation 24, wherein the query module is further configured to decline the query in response to a determination that the first user ID corresponding to the third user ID in the database, and the communication module is further configured to provide invitation to the user to bind the first user ID and the second user ID in response to a determination that the first user ID does not corresponds to the third user ID.

26. The system of implementation 22, wherein the communication module is further configured to receive, from a server associated with a social network service, a binding request for binding a pseudo account ID to the first user ID of a user, the pseudo account ID corresponding to a user ID used by the user to access the social network service.

27. The system of implementation 26, wherein the plurality of components further comprise a verification module configured to: generate a verification code in response to the binding request; transmit the verification code to a user device associated with the user using the first user ID; and receive confirmation of the verification code from the server.

28. The system of implementation 27, wherein the verification module is further configured to: associate the first user ID and the pseudo account ID; and store association between the first user ID and the pseudo account ID.

29. The system of implementation 22, wherein the query module is further configured to monitor compromised status of multiple online accounts associated with online services.

30. The system of implementation 29, wherein the compromised status indicates whether the one or more online accounts are compromised.

31. The system of implementation 29, wherein information of login authentication of the one or more online accounts comprises the first user ID.

32. The system of implementation 22, wherein the first user ID comprises an email address or a phone number of the user.

33. One or more computer-readable media storing computer-executable instructions that, when executed on one or more processors, causes the one or more processors to perform acts comprising: receiving, from a server, a binding request for binding a pseudo account ID to a first user ID of a user, the pseudo account ID corresponding to a second user ID used by the user to access the social network service; generating a verification code in response to the binding request; transmitting the verification code to a user device using the first user ID; receiving confirmation of the verification code from the server; associating the first user ID and the pseudo account ID; and storing association between the first user ID and the pseudo account ID.

34. The one or more computer-readable media of implementation 33, wherein the acts further comprise: monitoring compromised status of multiple online accounts associated online services.

35. The one or more computer-readable media of implementation 34, wherein the compromised status indicates whether the multiple online accounts are compromised, and information of login authentication of the multiple online accounts comprises the first user ID.

36. The one or more computer-readable media of implementation 35, wherein the acts further comprise: providing a report of the comprised status using the pseudo account ID.

37. The one or more computer-readable media of implementation 33, wherein the first user ID comprises an email address or a phone number of the user.

38. The one or more computer-readable media of implementation 33, wherein the acts further comprise: disabling a search function for searching compromised status of one or more online account using the first user ID based on the stored association.

39. The one or more computer-readable media of implementation 38, wherein the disabling the search function for searching the compromised status of the one or more online account using the first user ID based on the stored association comprises: receiving a search request for searching compromised online accounts associated with the first user ID; and determining whether the search request includes information of the pseudo account ID.

40. The one or more computer-readable media of implementation 39, wherein: in response to a determination that the search request includes the information of the pseudo account ID, providing a report of the compromised status of the one or more online accounts associated with the first user ID; and in response to a determination that the search request does not include the information of the pseudo account ID, declining the search request.

41. A method for detection of a compromised user account, the method comprising: obtaining, by one or more processors of a computing device, a user credential that comprises a user identifier (ID) and a password that are associated with a user; anonymizing, by the one or more processors, the user ID by obscuring one or more letters of the user ID; transmitting, by the one or more processors to a server, the anonymized user ID to a server associated with the detection of the compromised user accounts; receiving, by the one or more processors, a record corresponding the anonymized user ID, the record comprising: a compromised ID comprising unobscured letters of the user ID, the compromised ID corresponding to a compromised password, a modified password obtained by removing characters of the compromised password except for the first and the last character of the compromised password and by further performing an encryption operation on the compromised password, a decryption algorithm associated with the encryption, and determining, by the one or more processors, whether the compromised ID of the record matches the user ID; in response to a determination that the compromised ID of the record matches the user ID, performing a decryption operation on the modified password using the decryption algorithms to obtain a generated password; determining, by the one or more processors, whether the generated password matches the password; and in response to a determination that the generated password matches the password, generating, by the one or more processors, a notification based on the user credential, the notification indicating that an account associated with the user credential is compromised.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for provision of risk information associated with user accounts, the method comprising:
performing, by one or more processors of a computer system, a hash algorithm on a password associated with a user account, thereby producing a hashed password;
modifying, by the one or more processors of the computer system, the hashed password using a predetermined method to remove a first portion of the hashed password, thereby producing a modified hashed password that includes a second portion of the hashed password;
transmitting, by the one or more processors of the computing system, the modified hashed password to a computing device of a service provider;
receiving, by one or more processors of the computing device, the modified hashed password;
modifying, by the one or more processors of the computing device, multiple passwords using the hash algorithm, the multiple passwords associated with multiple compromised accounts, thereby producing multiple hashed passwords;
searching, by the one or more processors of the computing device, a database comprising the multiple hashed passwords associated with the multiple compromised accounts;
identifying, by one or more processors of the computing device, from the multiple hashed passwords, one hashed password corresponding to the second portion of the hashed password included in the modified hashed password;
transmitting, by one or more processors of the computing device to the computing system, the one hashed password;
receiving, by the one or more processors of the computing system, the one hashed password; and
determining, by the one or more processors of the computing system, that the user password is compromised if the one hashed password matches at least the first portion of the hashed password and the second portion of the hashed password.

2. The method of claim 1, wherein modifying, by the one or more processors of the computer system, the hashed password comprises:
anonymizing the hashed password by obscuring a portion of the hashed password to obtain the modified hashed password by at least:
determining a first character of the hashed password;
determining a last character of the hashed password;
keeping the first character of the hashed password;
keeping the last character of the hashed password; and
removing other characters of the hashed password.

3. The method of claim 1, wherein modifying, by the one or more processors of the computer system, the hashed password comprises keeping first N characters of the hashed password; and removing any remaining characters of the hashed password that are after the first N characters.

4. The method of claim 1, wherein the identifying one password corresponding to the modified password comprises:
identifying one hashed password from the multiple hashed password, the one hashed password matching a pattern of the second portion of the hashed password.

5. The method of claim 2, wherein the hash algorithm is MD5, SHA1, or SHA256.

6. The method of claim 1, wherein the password is a password in plain text.

7. The method of claim 1, wherein the password is inaccessible to the computing device.

* * * * *